(12) United States Patent
Dufault

(10) Patent No.: US 10,442,530 B2
(45) Date of Patent: Oct. 15, 2019

(54) SUSPENSION FOR AIRCRAFT TAIL WHEEL

(71) Applicant: Daniel Roger Dufault, Lincolnville, ME (US)

(72) Inventor: Daniel Roger Dufault, Lincolnville, ME (US)

(*) Notice: Subject to any disclaimer, the term of this patent is extended or adjusted under 35 U.S.C. 154(b) by 111 days.

(21) Appl. No.: 15/238,110

(22) Filed: Aug. 16, 2016

(65) Prior Publication Data

US 2017/0217574 A1 Aug. 3, 2017

Related U.S. Application Data

(60) Provisional application No. 62/288,644, filed on Jan. 29, 2016.

(51) Int. Cl.
*B64C 25/62* (2006.01)
*B64C 25/36* (2006.01)

(52) U.S. Cl.
CPC .............. *B64C 25/62* (2013.01); *B64C 25/36* (2013.01)

(58) Field of Classification Search
CPC ......... B64C 25/58; B64C 25/62; B64C 25/64; B64C 25/36
USPC ............................................ 244/109, 104 CS
See application file for complete search history.

(56) References Cited

U.S. PATENT DOCUMENTS

| | | | | |
|---|---|---|---|---|
| 1,376,912 A * | 5/1921 | Ajello | .................... | B64C 25/06 188/130 |
| 1,642,699 A * | 9/1927 | Smith | .................... | B64C 25/50 244/109 |
| 1,668,887 A * | 5/1928 | Blair | .................... | B64C 25/60 244/100 R |
| 1,794,796 A * | 3/1931 | Reichert | .................. | B64C 25/50 244/109 |
| 1,802,692 A * | 4/1931 | Zindel | ..................... | B64C 25/06 244/104 CS |
| 1,855,020 A * | 4/1932 | Henrichsen | ............. | B64C 25/50 244/109 |
| 1,856,778 A * | 5/1932 | Monteith | ................ | B64C 25/50 244/109 |
| 1,983,358 A * | 12/1934 | Fink | ........................ | B64C 25/62 244/104 CS |
| 2,008,094 A * | 7/1935 | Chester | .................... | B64C 25/14 244/102 R |
| 2,034,083 A * | 3/1936 | Butler | ..................... | B64C 25/68 244/109 |
| 2,242,125 A * | 5/1941 | Hineman | ................ | B64C 25/14 244/102 R |
| 2,299,613 A * | 10/1942 | Cleveland | ............. | B64C 25/505 244/104 R |
| 2,312,553 A * | 3/1943 | Hudson | ................... | B64C 25/50 244/109 |

(Continued)

*Primary Examiner* — Medhat Badawi
*Assistant Examiner* — Christopher D Hutchens
(74) *Attorney, Agent, or Firm* — H. Jay Spiegel

(57) ABSTRACT

A reciprocating shock absorber combined with a coil spring are interposed between the fuselage of an aircraft and the tail wheel. When the tail wheel engages the runway, its attachment pivots, thereby compressing the shock absorber and the coil spring. This results in smooth transfer of forces from the tail wheel to the fuselage and to the pilot and passengers. If desired, one or more tension springs may counteract the forces imposed by the coil spring to restore the extended configuration of the coil spring and shock absorber.

19 Claims, 9 Drawing Sheets

(56) References Cited

U.S. PATENT DOCUMENTS

| | | | | | |
|---|---|---|---|---|---|
| 2,408,354 | A | * | 9/1946 | Trimbach | B64C 25/68 |
| | | | | | 244/110 G |
| 2,454,658 | A | * | 11/1948 | Leitch | B64C 25/14 |
| | | | | | 244/102 R |
| 2,459,982 | A | * | 1/1949 | Wells | B64C 25/60 |
| | | | | | 244/102 R |
| 2,517,509 | A | * | 8/1950 | Sikorsky | B64C 1/00 |
| | | | | | 123/41.11 |
| 2,544,855 | A | * | 3/1951 | Parker | B64C 25/50 |
| | | | | | 244/102 R |
| 2,563,518 | A | * | 8/1951 | Dickerman | B64C 25/60 |
| | | | | | 244/104 FP |
| 2,599,690 | A | * | 6/1952 | Buivid | B64C 1/00 |
| | | | | | 244/17.11 |
| 2,692,095 | A | * | 10/1954 | Carpenter | B64C 37/00 |
| | | | | | 244/49 |
| 2,692,098 | A | * | 10/1954 | Schmued | B64C 25/62 |
| | | | | | 244/104 R |
| 4,390,151 | A | * | 6/1983 | Schneider | B64C 25/52 |
| | | | | | 180/183 |
| 2017/0217574 | A1 | * | 8/2017 | Dufault | B64C 25/62 |

\* cited by examiner

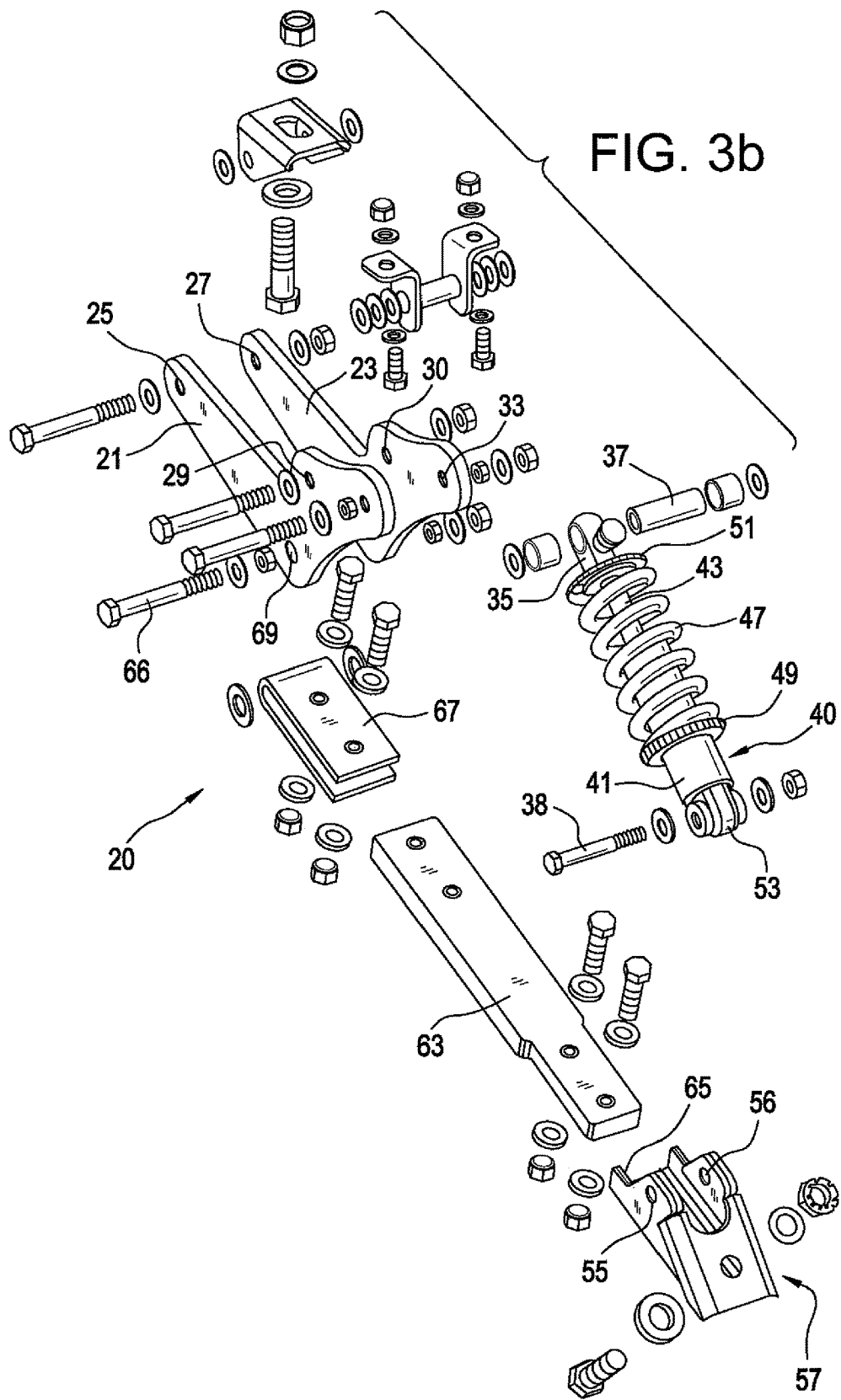

SUSPENSION FOR AIRCRAFT TAIL WHEEL

The present invention relates to an improved suspension for aircraft tail wheel. Applicant claims priority from Provisional Application Ser. No. 62/288,644, filed Jan. 29, 2016.

BACKGROUND OF THE INVENTION

In the prior art, small aircraft typically include a tail wheel that engages the ground during takeoff and, when the aircraft is landing, re-engages the ground with a "bump" that may be severe. Prior art small aircraft typically include what is supposed to be a shock absorbing system consisting of leaf springs. There are primarily two types of aircraft that employ tail wheel leaf springs. The first is an aircraft having an aluminum outer shell riveted to bulkheads and stringers. The second type has an airframe made of tubular inner structure covered with fabric. The present invention comprises an effective replacement of the tail wheel suspension of either type.

In this regard, reference is made to FIGS. 1 and 2 which show the prior art leaf spring system. An aircraft (FIG. 2) is generally designated by the reference numeral 1 and includes a tail wheel 3 connected to the fuselage 4 by a bracket 6 and a fastener 7 which may consist of one or more bolts fixed with nuts (not shown). Three leaf springs 8 usually constructed of tempered steel engage one another and extend from the fastener 7 through the fastener 6 and curve downward where they are attached by another fastener 9 to a bracket 10 from which emanates a fork 11 to which the wheel 3 is rotatably attached via an axle (not shown) fastened by fasteners 13, one of which is seen in FIG. 2. The bracket 10 also supports the fork 11 for rotation about a vertical axis to allow the wheel 3 to rotate about that axis. The springs 8 are typically 1.25" to 1.75" wide. Side loads cause them to twist laterally, causing the tail wheel to shimmy and stressing the springs 8 and their mounts.

If desired, tension springs 15, 17 may be employed to provide a restoring force once the wheel 3 engages the ground and causes flexing of the leaf springs 8.

Other problems arise in the leaf spring suspension systems. In particular, when installed, the leaf springs have a factory pre-set degree of bending. Over time, the leaf springs can change in configuration, flattening out to some degree. This results in lowering of the rear of the fuselage and changing the angulation of the tail wheel 3 with respect to the fuselage and runway. As a result, tail wheel shimmy can result. What is meant by tail wheel shimmy is that the tail wheel can pivot side-to-side as the aircraft is traveling down the runway similar to what one sees in a grocery cart. This shimmying of the tail wheel can adversely impact control of the aircraft while at the same time causing vibrations that can damage the fuselage. In such circumstances, it is necessary to remove the leaf springs and bend them back to original factory specifications. This can be time consuming, labor intensive, and expensive.

Another problem encountered in an aircraft tail wheel is that it is typically pneumatic. In other words, the tail wheel is filled with pressurized air or other gas. When leaf spring suspension systems are used, their stiffness requires a gas-filled tail wheel because the tail wheel acts as a further shock absorber to supplement the limited shock absorbing capability of stiff leaf springs. It would be advantageous if a shock absorbing system for an aircraft tail wheel were provided that provides sufficient flexibility and resiliency in shock absorbing capability that a solid rubber or synthetic rubber tail wheel could be used. Such a configuration would eliminate maintenance and safety problems resulting from flat tires.

While the intention of the prior art suspension illustrated in FIGS. 1 and 2 is to cushion engagement of the wheel 3 with the runway upon landing, in fact, the leaf springs 8 are substantially ineffective in doing so. Rather, they are so stiff that when the wheel 3 engages the runway, little cushioning takes place and forces are transmitted from the wheel 3 to the fuselage 4 causing stresses to the fuselage 4 which can result in structural damage. In fact, typically the tail wheel bounces several times in a bouncing effect, until the bouncing dissipates due to the lack of resiliency of the leaf springs.

Additionally, forces transmitted from the wheel 3 to the fuselage 4 are also felt by the pilot and passengers as a significant bump which can be jarring. Typically, the leaf springs lose their arched configuration over time such that the tail wheel becomes misaligned with respect to the geometry of the aircraft. The only solution is expensive leaf spring replacement. Accordingly, a need has developed for a suspension for the tail wheel of a small aircraft that effectively performs the function of cushioning the effect of the tail wheel engaging the runway during a landing. It is with this need in mind that the present invention was developed.

SUMMARY OF THE INVENTION

The present invention relates to an improved suspension for aircraft tail wheel. The present invention includes the following interrelated objects, aspects and features:

(1) In a first aspect, the present invention is disclosed in two alternative embodiments. In a first embodiment, a single reciprocating shock absorber combined with a coil spring are interposed between the fuselage and the tail wheel. When the tail wheel engages the runway, its attachment pivots, thereby compressing the shock absorber and the coil spring. This results in smooth transfer of forces from the tail wheel to the fuselage and to the pilot and passengers. If desired, one or more tension springs may counteract the forces imposed by the coil spring to restore the extended configuration of the coil spring and shock absorber.

(2) In a second embodiment, two shock absorbers are provided mounted parallel to one another so that they split the load imposed by engagement of the tail wheel on the runway. These parallel shock absorbers may also be supplemented by coil springs as in the first-mentioned embodiment and may also be supplemented, if desired, by one or more tension springs to provide a restoring force. In either embodiment, the inventive shock absorbers are sufficiently resilient and flexible that, if desired, a solid rubber or synthetic rubber tail wheel may be employed.

(3) The amount of force necessary to compress the shock absorbers and coil spring(s) may be adjusted depending upon the weight of the aircraft as loaded with pilot, passengers, fuel and baggage, and may also be adjusted depending upon the degree of cushioning desired. Thus, the adjustment can result in a longer travel of the shock absorber pistons or a shorter travel as desired. The present invention eliminates the bouncing effect caused by non-resilient leaf springs and typically results in the tail wheel remaining on the runway after it first engages the runway. The present invention, in either embodiment, is designed to replace the prior art leaf spring type suspension using the same fuselage mounts. Its weight is similar to the suspension it replaces. The ability to adjust the travel of the inventive shock absorbers eliminates the problems described above, where leaf spring type shock absorbers are employed, namely, changes in the curvature of leaf springs and tail wheel shimmy. Tail wheel shimmy, when it occurs, may easily be cured by adjusting the travel of the shock absorbers.

As such, it is a first object of the present invention to provide an improved suspension for aircraft tail wheel.

It is a further object of the present invention to provide such a device in which a stiff leaf spring assembly is replaced with a shock absorber and perhaps a coil spring to more effectively cushion forces imposed on the fuselage when the tail wheel of a small aircraft engages the runway during landing.

It is a yet further object of the present invention to provide such a device in which a plurality of parallel-mounted shock absorbers may be employed.

It is a still further object of the present invention to provide such a device in which plural shock absorbers may be supplemented by plural coil springs as desired.

It is a yet further object of the present invention to provide such a device in which one or more tension springs are provided to provide a restoring force to restore the orientation of the shock absorbers to their extended configuration.

These and other objects, aspects and features of the present invention will be better understood from the following detailed description of the preferred embodiments when read in conjunction with the appended drawing figures.

BRIEF DESCRIPTION OF THE DRAWINGS

FIG. 3b shows an exploded perspective view of the embodiment of FIG. 3a.

SPECIFIC DESCRIPTION OF THE PREFERRED EMBODIMENTS

Figure 1:
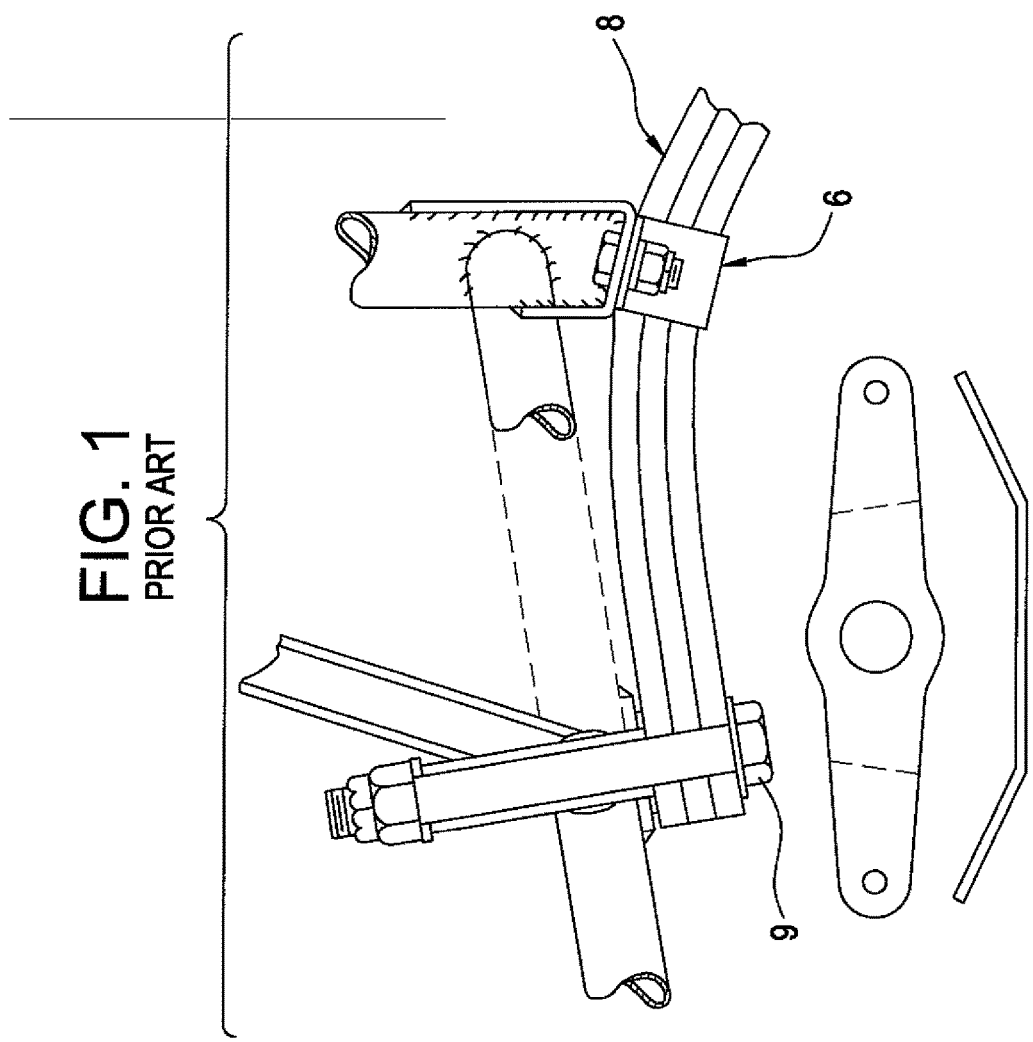
FIG. 1 shows a side view of a prior art leaf spring suspension system for an aircraft tail wheel.

Reference is first made to FIGS. 3a-6 which depict a first embodiment of the present invention in which a single shock absorber is included. The first embodiment is generally designated by the reference numeral 20 and is seen to include parallel L-shaped brackets 21 and 23 having holes 25, 27, 29, 31 and holes 30 and 33 (FIG. 3b) opposed to the holes 29 and 31, respectively. The holes 25 and 27 facilitate mounting the device 20 on the fuselage of an aircraft. The holes 31 and 33 (FIG. 3b) mount a shaft 37 (FIG. 3b) allowing pivoting of the attachment end 35 of a shock absorber 40 having a cylinder 41 and a piston 54 (shown in phantom in FIG. 3) attached to a piston rod 43. The piston rod 43 is attached to the attachment end 35 and is constrained to move therewith. A compression coil spring 47 extends between a disk 49 permanently affixed to the outer walls of the cylinder 41 and a further disk 51 attached to the attachment end 35. The cylinder 41 has a U-shaped bracket 53 that attaches about a pivot bolt 38 (FIG. 3b) extending through holes 55 and 56 (FIG. 3b). A further bracket 57 is designed to allow attachment of a tire 60 as seen, for example, in FIGS. 4, 5 and 6.

Figure 3A:
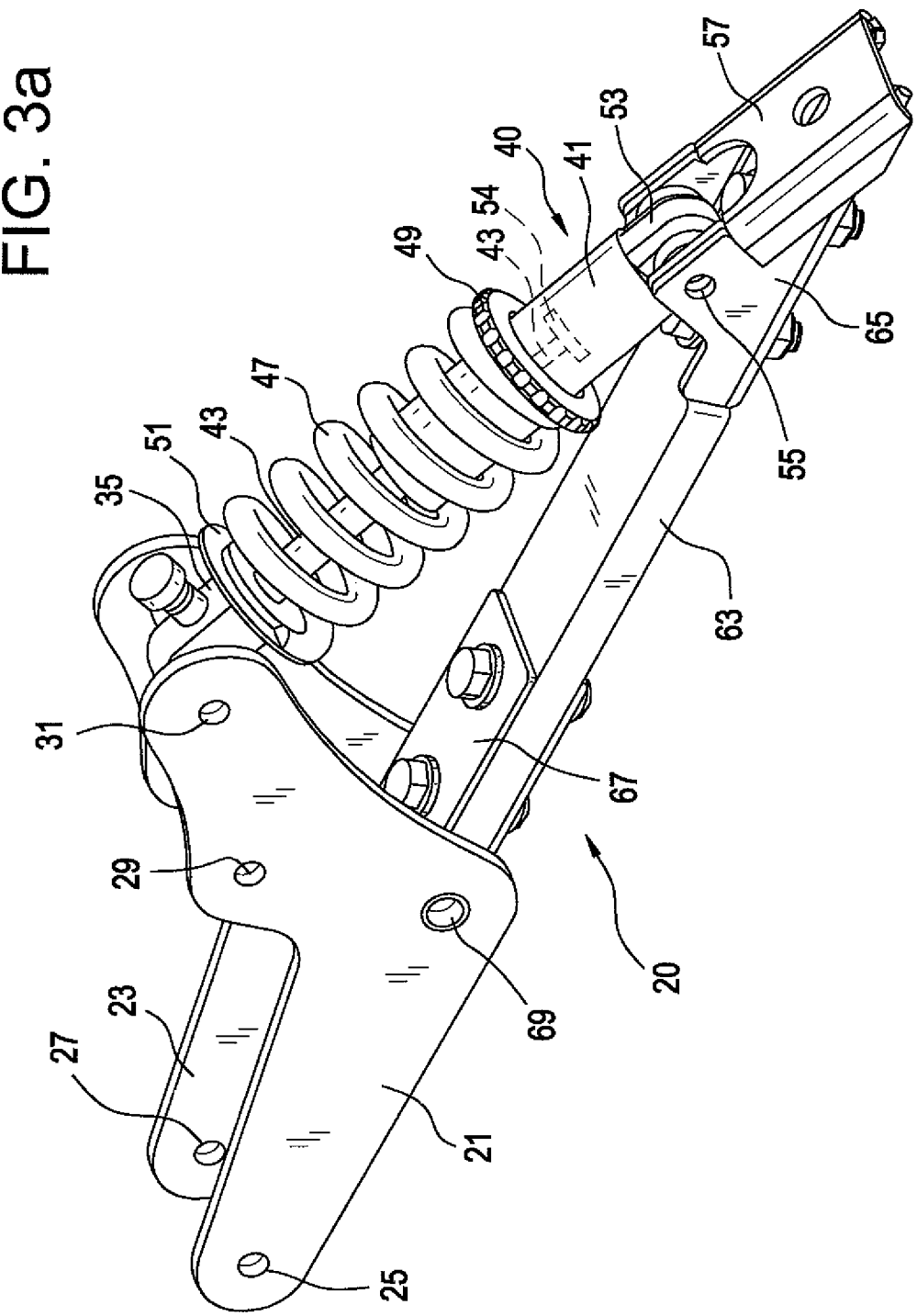
FIG. 3a shows a side perspective view of a first embodiment of the present invention.

With further reference, in particular, to FIGS. 3a and 3b, a plate 63 is attached between further plate 65 carrying the pivot at hole 55 and in which the cylinder 41 pivots and at its other end to a bracket 67 pivotably attached at the hole 69 by bolt 66. These features are also seen, in particular, in FIGS. 4-6.

Figure 4:
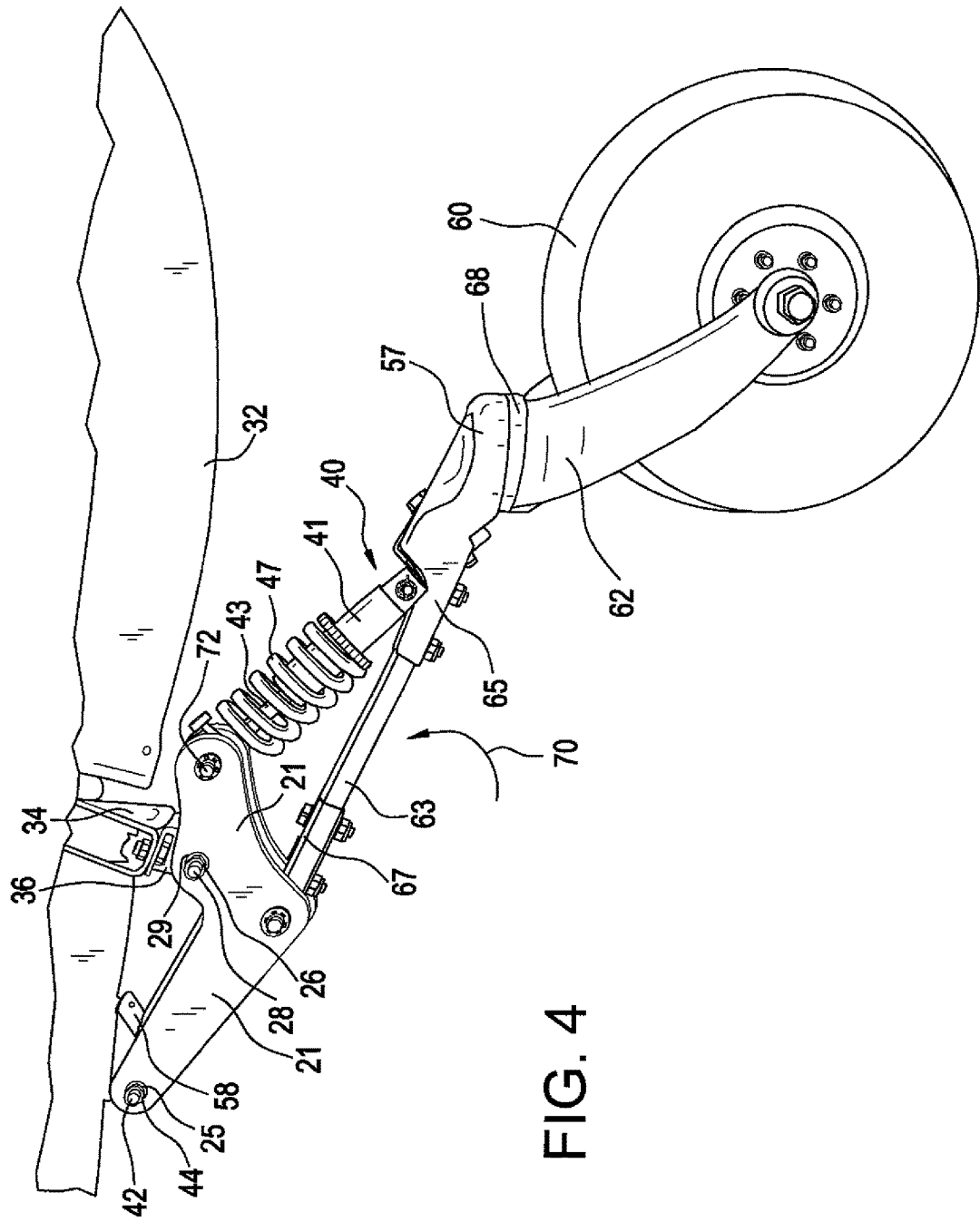
FIG. 4 shows a view similar to that of FIG. 3a but showing the embodiment affixed to the fuselage of an aircraft.
Figure 5:
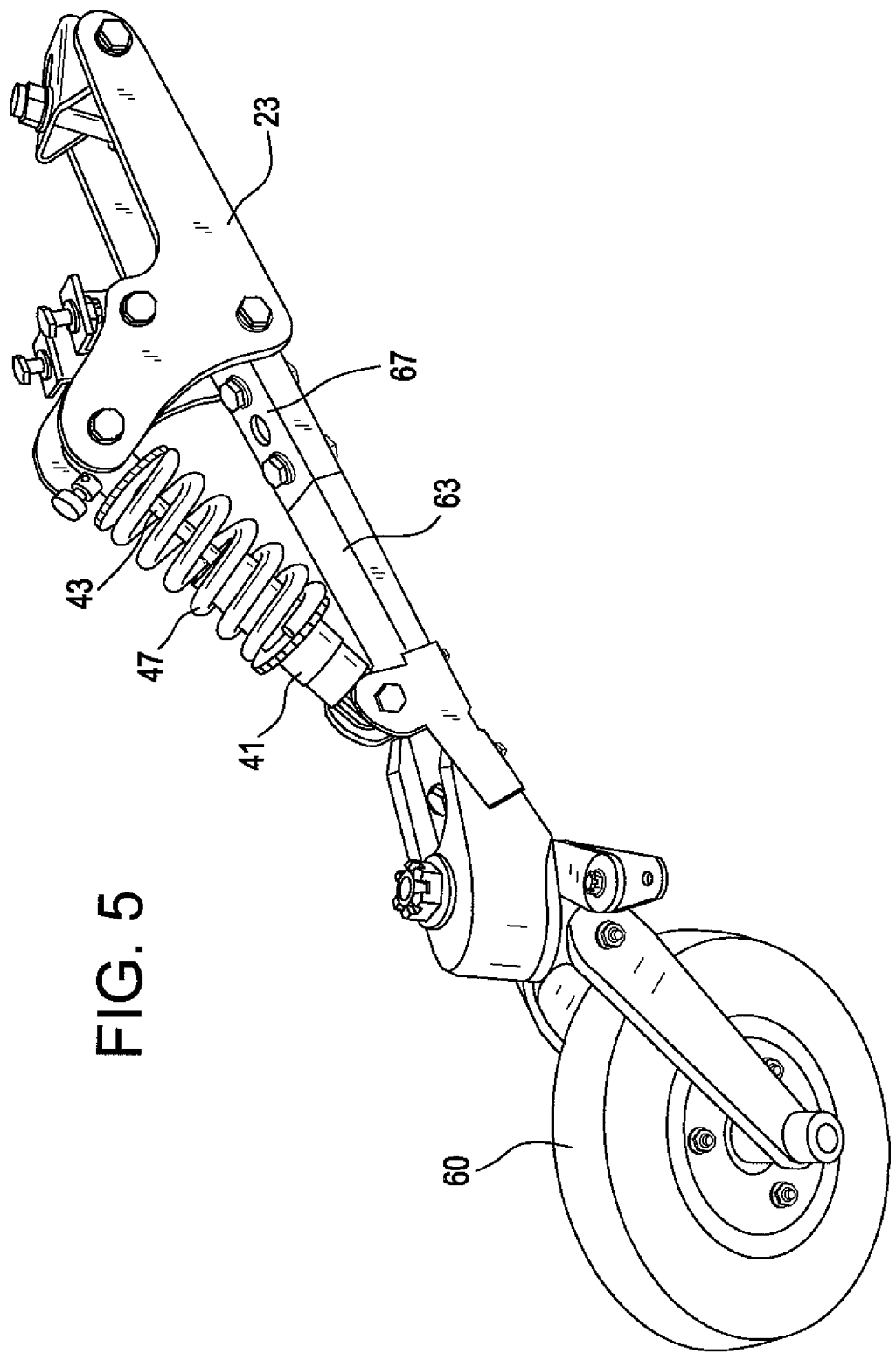
FIG. 5 shows a side perspective view from the other side of the first embodiment.

FIG. 4 shows the brackets 21, 23 mounted on the fuselage 32 of the aircraft. As seen, a bracket 34 depends downwardly from the fuselage 32 and attaches to a bracket 36 affixed via the hole 29 and a bolt 28 and nut 26. Similarly, the hole 25 allows attachment to the fuselage 32 using a bolt 42 and nut 44 to a bracket 58 attached to the fuselage 32. Wheel or tire 60 is attached to the bracket 57 by virtue of a fork 62 affixed to the bracket 57 and able to rotate with respect to the bracket 57 by virtue of a bearing 68.

As should be understood with particular reference, for example, to FIG. 4, when the airplane is landing in the left hand direction in the view of FIG. 4, when the tire 60 touches the ground this causes pivoting of the bracket 63 in the direction of the arrow 70 as well as pivoting of the spring 47 and shock absorber 40 about the pivot bolt 72. While the shock absorber 40 and spring 47 are pivoting about the bolt 72, that action also causes compression of the shock absorber 40 and compression of the spring 47 to dampen the forces imposed upon the fuselage 32 by engagement of the tire 60 with the runway. Thus, during this action, the tire 60 pivots closer to the fuselage 32. At some point, the restoring force of the spring 47 causes the tire 60 to pivot in the opposite direction as the forces are dampened.

Figure 2:
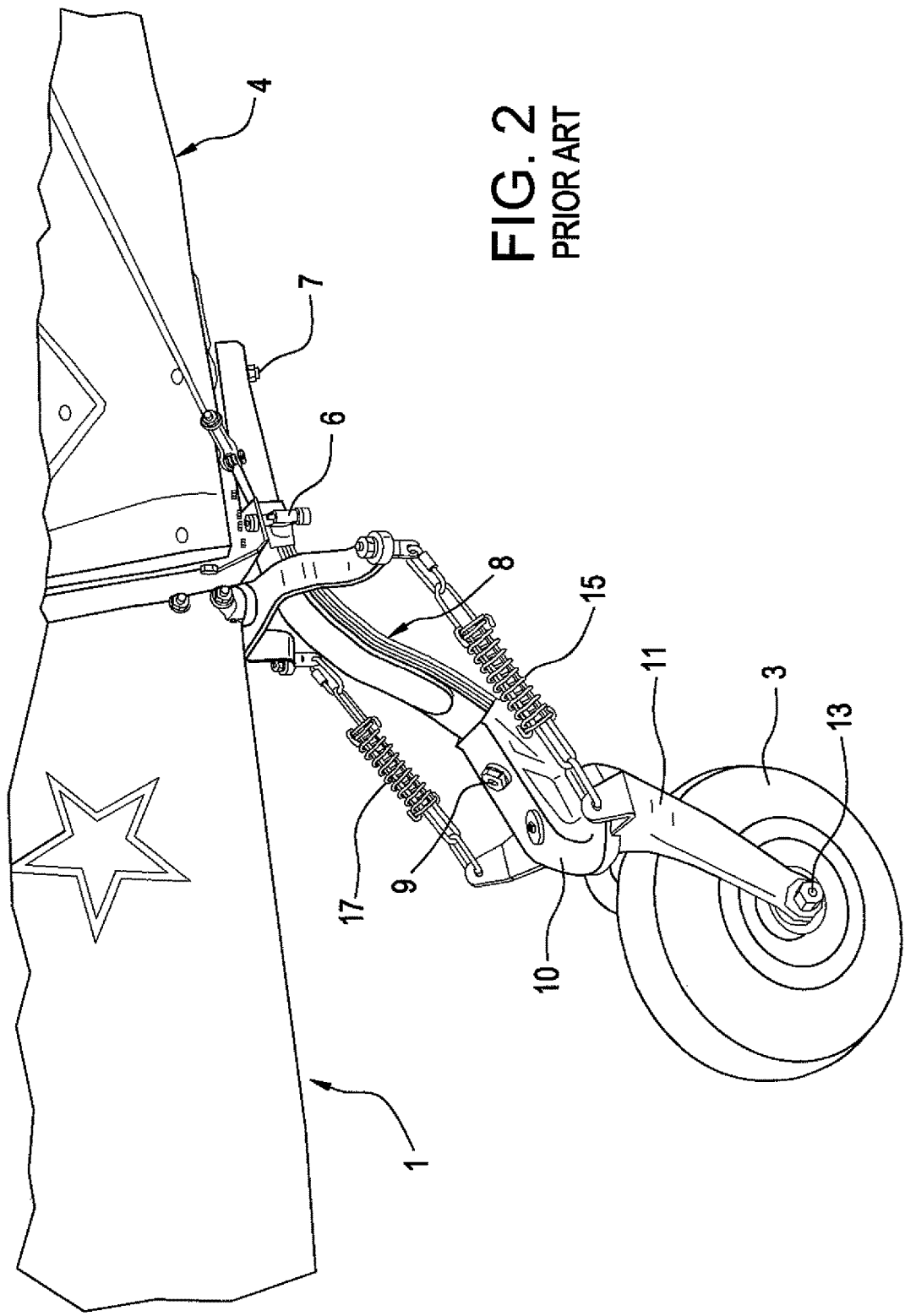
FIG. 2 shows a further perspective view of a leaf spring type prior art suspension system for a tail wheel as assembled to the fuselage of an aircraft.
Figure 6:
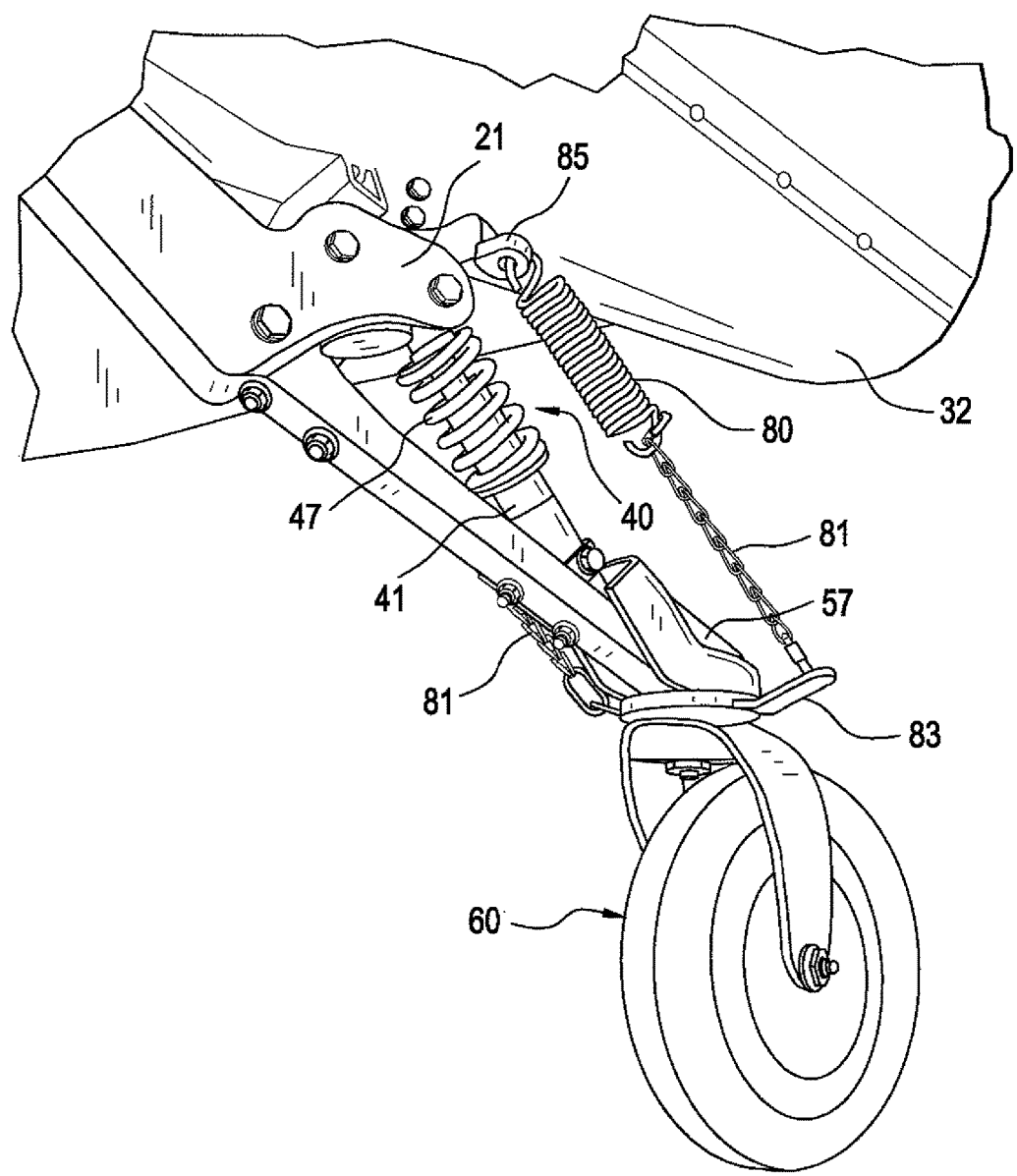
FIG. 6 shows a view looking rearward of the first embodiment of the present invention with the further proviso of tension springs.

With reference to FIG. 6, if desired, tension springs 80 may be interconnected with a chain 81 and an attachment 83 to the bracket 57 on the one hand, and a ring 85 attached to the bracket 21. A similar tension spring assembly not clearly shown in FIG. 6 but with its chain 81 visible is attached on the other side of the tire. The tension springs 80 provide a restoring force assisting the compression spring 47 in expanding the shock absorber 40 by moving the piston 54 upward within the cylinder 41. In this way, the forces imposed upon the fuselage 32 by the tire 60 engaging the runway are dampened in a much superior manner than is the case with the leaf springs 8 shown in FIGS. 1 and 2.

Figure 7:
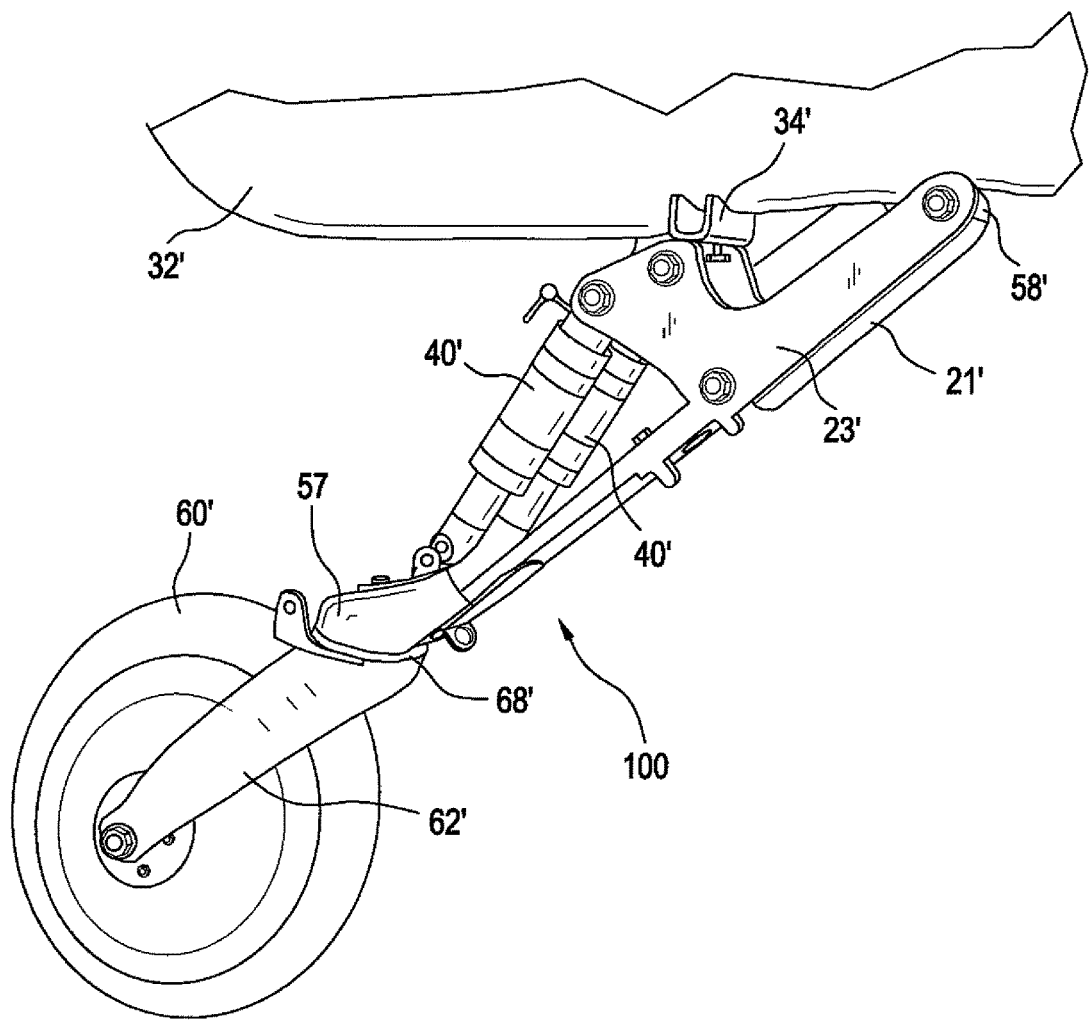
FIG. 7 shows a side perspective view of a second embodiment of the present invention as attached to the fuselage of a small aircraft.
Figure 8:
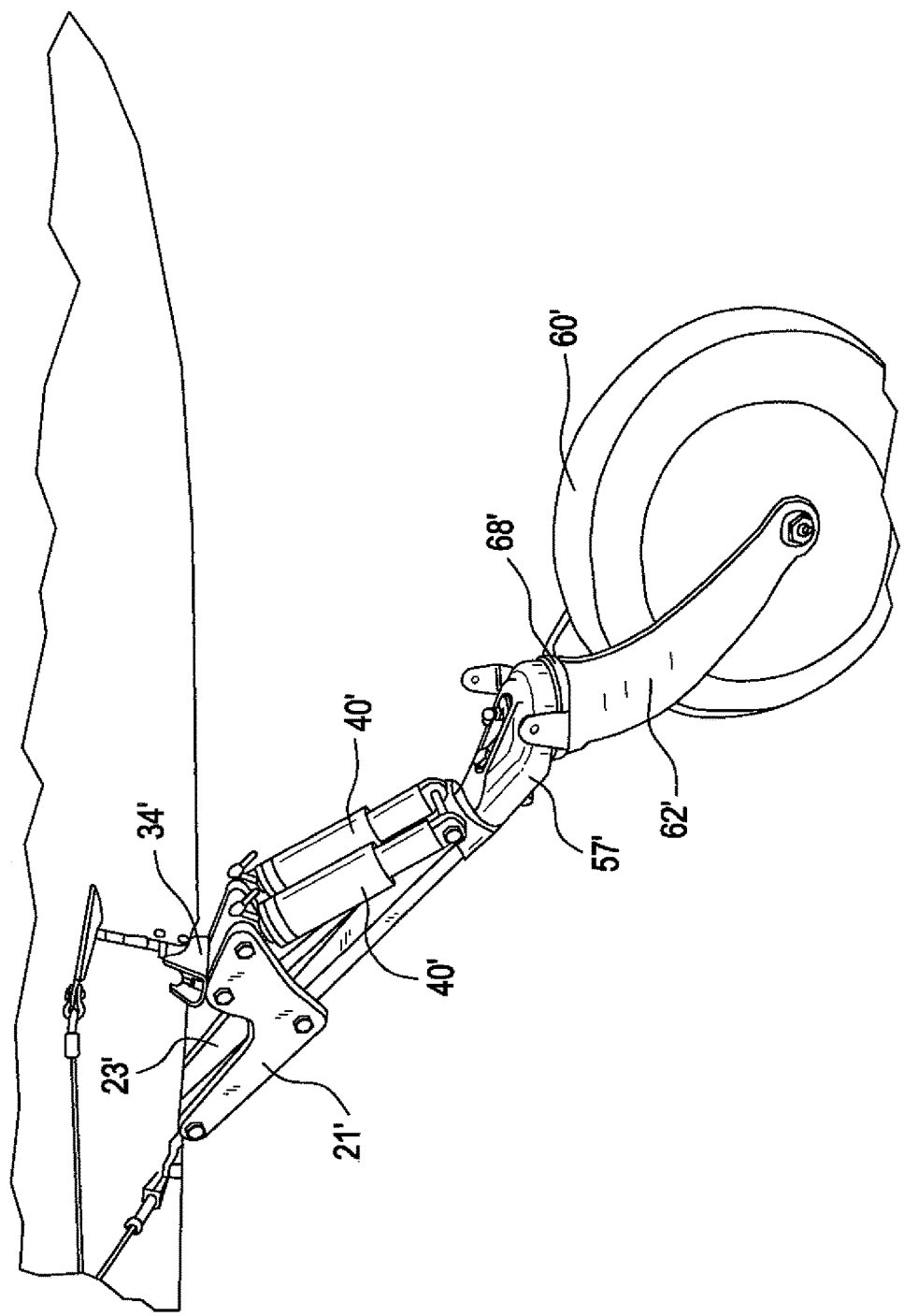
FIG. 8 shows a further perspective view from another angle of the second embodiment of the present invention.

With reference now to FIGS. 7 and 8, a further embodiment is shown in which corresponding elements are described using like primed reference numerals.

Thus, the embodiment of FIGS. 7-8 is generally designated by the reference numeral 100 and includes a tire 60' attached to a bracket 57' by a set of forks 62' pivotably mounted to the bracket 57' via a bearing 68' that allows rotation of the tire 60' with respect to the bracket 57'. The brackets 21' and 23' affix the device 100 to the fuselage 32' of the associated airplane. This is done through the provision of brackets 34' and 58'.

In this embodiment, plural shock absorbers 40' are attached to the device and coil springs may be omitted or included as desired. Additionally, tension springs may be included or omitted as desired. The main difference between the embodiment of FIGS. 3a-6 on the one hand, and the embodiment of FIGS. 7-8 on the other hand is the proviso of plural shock absorbers 40'.

Either embodiment of the present invention operates in a vastly superior manner than is the case with prior art leaf spring suspension systems. The dampening of forces exerted on the fuselage when the tire engages the runway upon landing is highly superior to the dampening created by stiff leaf springs which have barely any give to them, and can result in severe damage to the fuselage including cracking it and causing the aircraft to become non-air worthy. The present invention eliminates the bouncing effect of the prior art leaf springs, resulting in a smooth engagement of the tail wheel 60, 60' onto the runway and little or no bouncing thereafter. Through the use of the present invention, such issues are eliminated and the aircraft is not only rendered safer, additionally, the ride during landing is rendered highly more comfortable. Additionally, the brackets and other structural components are designed to eliminate the shimmy of the tail wheel that results from use of narrow leaf springs 8.

Accordingly, an invention has been disclosed in terms of preferred embodiments thereof, which fulfill each and every one of the objects of the invention as set forth hereinabove and provide a new and useful improved suspension for aircraft tail wheel of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. In an aircraft having one of (1) an aluminum outer shell riveted to bulkheads and stringers and (2) an airframe made of tubular inner structure covered with fabric, said aircraft having a tail wheel assembly that includes a suspension system comprising one or more leaf springs and a tail wheel comprising a tire filled with pressurized air, an improvement comprising a replacement tail wheel assembly, comprising:
   a) a bracket fixedly connected to an underside of a fuselage of said aircraft;
   b) an elongated arm having a first end pivotably connected to said bracket;
   c) a reciprocating shock absorber having a first upper end pivotably mounted to said bracket at a location under said fuselage and a second lower end pivotably mounted at a second end of said elongated arm;
   d) a tire sized to be attached at said second end of said elongated arm via an axle coupled to a fork mounted at said second end of said elongated arm, said axle spaced downward from a location where said second end of said reciprocating shock absorber is mounted at said second end of said elongated arm;
   e) whereby when said tire of said replacement tail wheel assembly engages a ground surface when said aircraft is landing, said elongated arm pivots about said bracket and said shock absorber pivots about said bracket and compresses, thereby damping forces created by said tire engaging said ground surface.

2. The replacement tail wheel assembly of claim 1, wherein a compression spring surrounds said shock absorber and compresses when said shock absorber compresses.

3. The replacement tail wheel assembly of claim 2, wherein a tension spring is connected between said bracket and said second end of said elongated arm to exert a restoring force in opposition to compression of said compression spring.

4. The replacement tail wheel assembly of claim 3, wherein a chain is interposed between said tension spring and said second end of said elongated arm.

5. The replacement tail wheel assembly of claim 4, wherein said bracket is L-shaped.

6. The replacement tail wheel assembly of claim 5, wherein a first leg of said bracket is connected to said fuselage and a second leg of said bracket is connected to said first end of said shock absorber.

7. The replacement tail wheel assembly of claim 1, wherein said first end of said shock absorber is at an end of a piston rod and said second end of said shock absorber is at an end of a cylinder.

8. The replacement tail wheel assembly of claim 7, wherein a coil spring is mounted between a disk on said piston rod and said cylinder.

9. The replacement tail wheel assembly of claim 8, wherein said disk is a first disk and said coil spring engages a second disk on said cylinder.

10. The replacement tail wheel assembly of claim 1, wherein said bracket is L-shaped.

11. The replacement tail wheel assembly of claim 10, wherein said bracket comprises two parallel L-shaped brackets mounted to either side of said elongated arm.

12. The replacement tail wheel assembly of claim 11, wherein said reciprocating shock absorber includes a piston mounted on a piston rod and contained within a cylinder, and a coil spring is mounted between a disk on said cylinder and a further disk mounted at an attachment end of said reciprocating shock absorber to which an end of said piston rod is attached.

13. The replacement tail wheel assembly of claim 12, wherein a tension spring is connected between said bracket and said second end of said elongated arm to exert a restoring force in opposition to compression of said compression spring.

14. The replacement tail wheel assembly of claim 1, wherein said shock absorber comprises two side-by-side shock absorbers mounted between said bracket and said second end of said elongated arm.

15. An improved suspension for an aircraft tail wheel, comprising:
   a) an L-shaped bracket fixedly connected to an underside of a fuselage of said aircraft;
   b) an elongated arm having a first end pivotably connected to said bracket;
   c) a reciprocating shock absorber having a first upper end pivotably mounted to said bracket at a location under said fuselage and a second lower end pivotably mounted at a second end of said elongated arm, and a compression spring surrounding said shock absorber and which compresses when said shock absorber compresses;
   d) a tire made of soft rubber attached at said second end of said elongated arm via an axle coupled to a fork mounted on said second end of said elongated arm, said axle spaced downward from a location where said second end of said reciprocating shock absorber is mounted at said second end of said elongated arm;
   e) whereby when said tire engages a ground surface when said aircraft is landing, said elongated arm pivots about said bracket and said shock absorber pivots about said bracket and compresses, thereby damping forces created by said tire engaging said ground surface.

16. The improved suspension of claim 15, wherein said first end of said shock absorber is at an end of a piston rod and said second end of said shock absorber is at an end of a cylinder, said coil spring being mounted between a first disk on said piston rod and a second disk on said cylinder.

17. The improved suspension of claim 15, wherein a tension spring is connected between said bracket and said second end of said elongated arm to exert a restoring force in opposition to compression of said compression spring.

18. The improved suspension of claim 15, wherein a first leg of said bracket is connected to said fuselage and a second leg of said bracket is connected to said first end of said shock absorber.

19. The improved suspension of claim 15, wherein said bracket comprises two parallel L-shaped brackets mounted to either side of said elongated arm.

* * * * *